United States Patent [19]

MacNeil

[11] Patent Number: 4,934,627
[45] Date of Patent: Jun. 19, 1990

[54] DE-REELER

[76] Inventor: Daniel J. MacNeil, 24 Hamilton Road, Barrie, Ontario, Canada, L4M 4S7

[21] Appl. No.: 243,043

[22] Filed: Sep. 12, 1988

[30] Foreign Application Priority Data

Sep. 11, 1987 [CA] Canada ............................ 546,641

[51] Int. Cl.$^5$ ............................................ B65H 49/00
[52] U.S. Cl. ................................ 242/128; 242/54 R; 242/129.8
[58] Field of Search .................... 242/54 R, 128, 129.8

[56] References Cited

U.S. PATENT DOCUMENTS

| | | | |
|---|---|---|---|
| 2,894,657 | 7/1959 | Van de Bilt | 242/128 |
| 2,942,797 | 6/1960 | Lorenz et al. | 242/128 |
| 2,999,654 | 9/1961 | Fuller | 242/128 |
| 3,323,752 | 6/1967 | Kurtz et al. | 242/129.8 |
| 3,815,844 | 6/1974 | Wright et al. | 242/128 |

FOREIGN PATENT DOCUMENTS

| | | |
|---|---|---|
| 549694 | 12/1957 | Canada . |
| 692279 | 8/1964 | Canada . |
| 855567 | 11/1970 | Canada . |
| 923098 | 3/1973 | Canada . |
| 875350 | 7/1981 | Canada . |
| 133781 | 10/1973 | United Kingdom ................ 242/128 |

Primary Examiner—Thomas R. Hannon
Attorney, Agent, or Firm—Wenderoth, Lind & Ponack

[57] ABSTRACT

Wire from a coil is drawn off generally axially thereof through a wire guide that is mounted to rotate about the periphery of the coil. Pivotal movement of the wire guide in response to demand for wire energizes a pneumatic linear motor which through a ratchet mechanism drives the spindle on which the coil is supported.

23 Claims, 6 Drawing Sheets

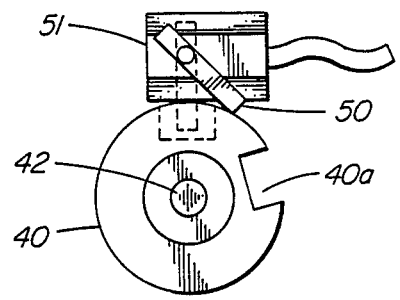
FIG. 5
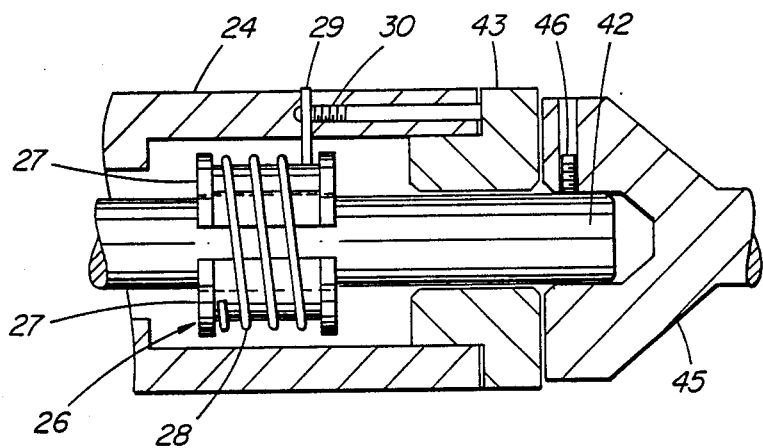
FIG. 6a
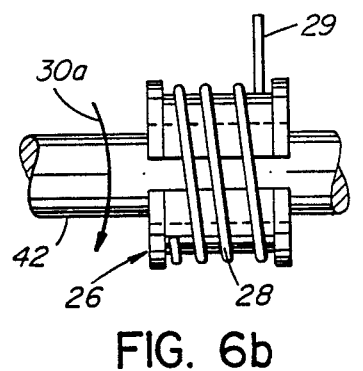 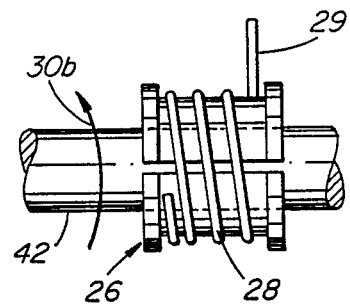
FIG. 6b        FIG. 6c

DE-REELER

BACKGROUND OF THE INVENTION a. Field of the Invention

This invention relates to improvements in de-reelers. These mechanisms, otherwise referred to as coil unwinders, wire feeders, etc. have a wide range of applications, and are especially useful in feeding welding wire from a coil to an automatic welding machine. In this application it is important that the material should be fed automatically upon demand at a rate corresponding to the rate of usage in the welding machine, and in such a manner that the wire is without twists or kinks, and without excessive tension being required to draw the wire material from the coil.

b. Description of the Prior Art

Machines which perform these functions have been known for some time, and can be classified according to the arrangement of the coil and the guiding device, i.e. whether the material is removed from the coil in a tangential direction, or in the axial direction of the coil. Such machines may be powered or unpowered. Where powered the motive force can be supplied by a rotary motor such as an electric or a fluid motor, or by a linear motor, e.g. a reciprocating pneumatic piston/cylinder unit.

Generally speaking, a power actuated de-reeler should be capable of:

1. detecting the demand for material to be fed,
2. accelerating the coil to the required speed to deliver the material therefrom,
3. maintaining the required speed as long as the demand is present, and
4. decelerating the coil when the demand ceases Desirably the machine should be capable of operating over a wide range of speeds without the need for adjustment, should be able to avoid breakage of the material in the event that the machine malfunctions or fails to operate properly, should facilitate loading and/or unloading of the coil, and should be of low cost, and if possible portable There have been numerous prior proposals for de-reeler machines, and a number of such machines are commercially available, but apparently for economic reasons have not found widespread use. De-reelers using rotary drive motors are relatively expensive because due to the large inertial forces that must be overcome in accelerating a heavy metal coil, e.g. of welding wire within the short time available, powerful and therefore expensive motors are required. De-reelers employing pneumatic or hydraulic linear actuator means, while generally lower in cost, also have a number of drawbacks, and in particular have generally required relatively large actuators capable of accelerating the coil to the required speed within a single stroke of the actuator.

SUMMARY OF THE INVENTION

The present invention provides a de-reeler adapted to support a coil of strand-like material and to unwind such material from the coil automatically on demand, said de-reeler comprising: a frame; a cradle mounted to rotate about an axis in said frame and adapted to receive the coil generally co-axially thereon; powered actuator means supported on said frame and operative to effect angular movement of said cradle and coil in one direction of rotation to unwind material from the coil; guide means pivotally mounted to move angularly about the axis of the coil to guide drawn-off material away from the coil in a given direction, said guide means being adapted to react to tension applied to the drawn-off material to move angularly in the other direction of rotation; sensor means adapted to respond to movement of the guide means in said other direction to energise said power-actuated means and rotate said coil in said one direction thereby to unwind additional material from the coil, such that when the rate at which additional material is unwound from said coil exceeds the rate at which the material is drawn off through the guide means, the guide means is freed to move in said one direction and condition said sensor means to de-energise said power actuated means.

Preferably the actuator means is a fluid powered piston cylinder unit coupled to drive the cradle through a ratchet mechanism. Supply of pressurized fluid to the piston cylinder unit is controlled by a fluid valve which is spring loaded to a position in which it permits pressurized fluid to be exhausted from the unit. The sensor means when actuated by the guide means urges the fluid valve to an active position wherein it directs pressurized fluid to the piston/cylinder unit to perform a power stroke, this linear stroke being converted to rotation of the cradle and coil through the ratchet mechanism. A proximity switch activated at the end of the power stroke causes the fluid valve to move to the exhaust position, the proximity switch being deactivated at the end of the return stroke of the piston/cylinder unit.

The guide means is preferably supported on a radial bail arm carried on a shaft that extends through the axial region of the coil and is continuously rotatable such that even when the coil is stationary, material can still be drawn off in the axial direction continuously through the guide means, the latter rotating through one complete revolution for each turn of material drawn off from the coil. Thus the material can still be drawn off even if the powered actuator means should fail to function, although in this mode the drawn off material will not be drawn off in untwisted condition.

BRIEF DESCRIPTION OF THE DRAWINGS

The invention will further be described, by way of example only, with reference to the accompanying drawings wherein:

FIG. 5 is a view from the left hand end of FIG. 4;

FIG. 6a is an enlarged view of detail 6a in FIG. 4;

FIG. 6b and 6c are views corresponding to FIG. 6a showing different conditions of operation;

Figure 1:
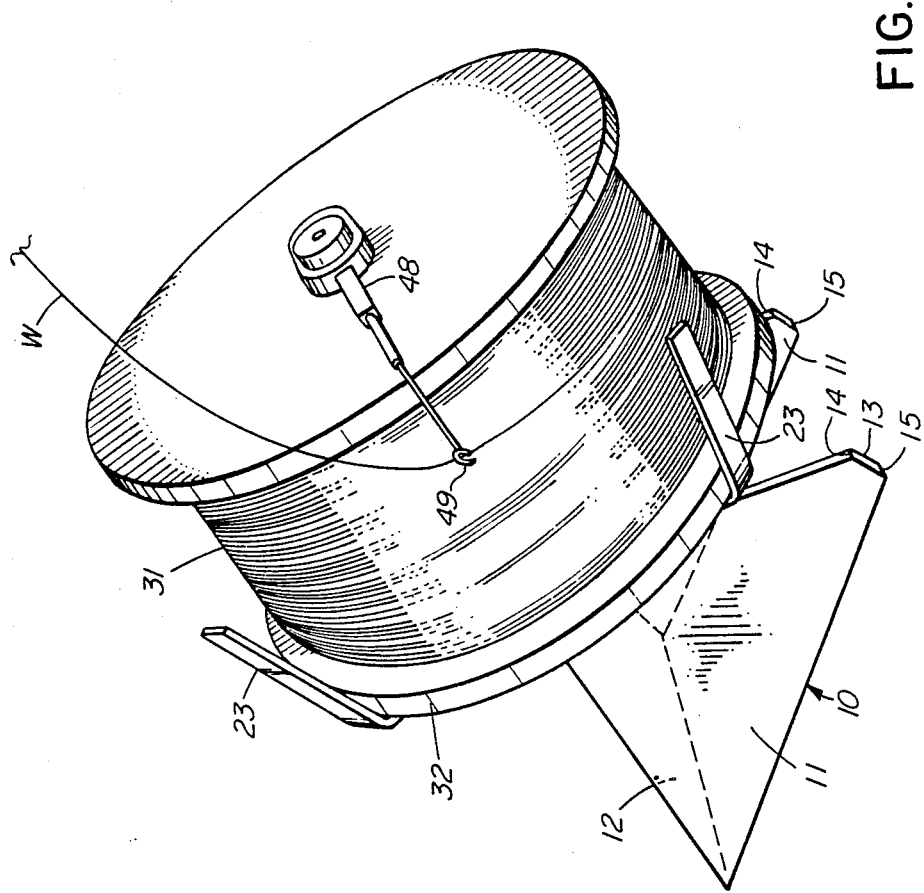
FIG. 1 is a perspective view of a presently preferred embodiment of de-reeler in accordance with the invention, illustrated with a spool of material positioned thereon.

The de-reeler comprises a frame 10 fabricated in sheet metal and of inverted U-shape having vertical side walls 11 spanned by a top plate 12 arranged at an angle of about 40° to the horizontal, the frame being open towards the front. Each sidewall 11 has an inclined front edge with upper and lower ends 14 and 15 that define angled corners.

Figure 2:
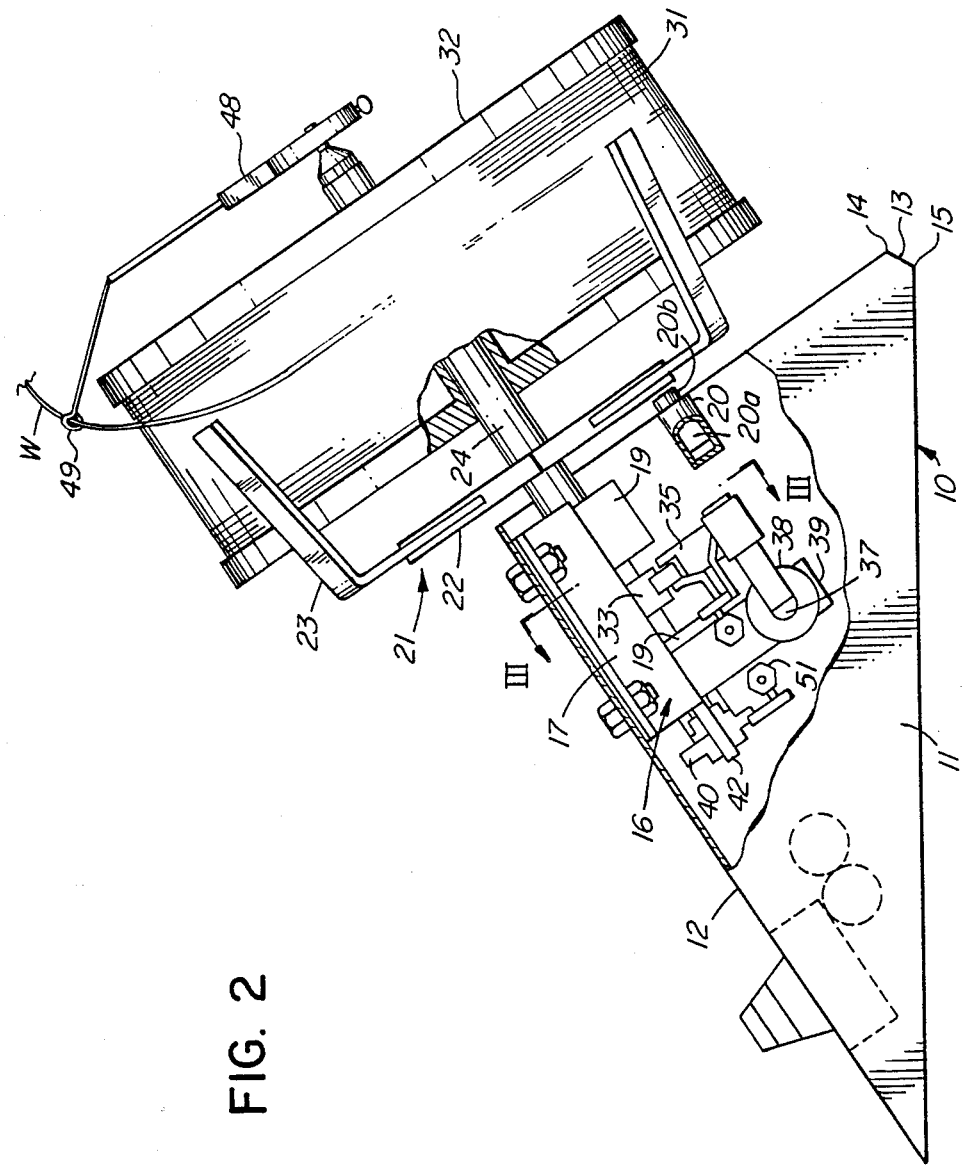
FIG. 2 is a partly sectioned elevational view of the de-reeler.
Figure 3:
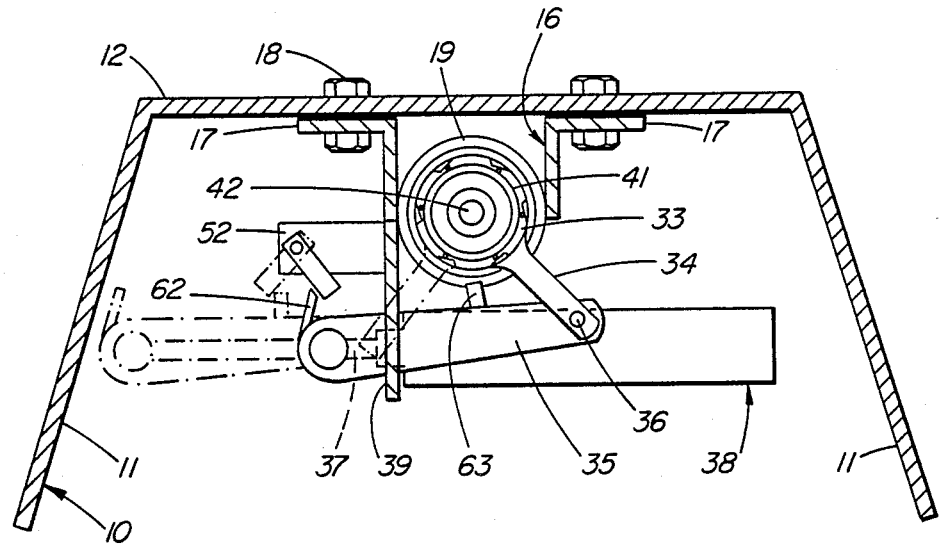
FIG. 3 is a sectional view to an enlarged scale taken on the line III—III in FIG. 2.

As is best seen in FIGS. 2 and 3, a support assembly 16 is centrally attached on the underside of the top plate 12 and comprises a pair of L-shaped brackets 17 attached to the top plate 12 by suitable fasteners 18 and supporting between them two axially spaced bearing assemblies 19. These bearing assemblies rotatably journal a cylindrical spindle 24 which projects forwardly and upwardly from the open front of the frame 10 and carries thereon a cradle 21. The cradle 21 is fixed to rotate with the spindle 24 and comprises a planar hub 22 having four radially extending arms 23, the outer end of each arm being angled upwardly as seen in FIG. 1. The cradle 21 carried on the spindle 24 is rotatably mounted on an axis 25 parallel to the top plate 12 by the bearing assemblies 19.

As best seen in FIGS. 2 and 3, the spindle 24 extends between the bearing assemblies 19 through a ratchet housing 33 that carries a ratchet mechanism which is adapted to apply driving rotation to the spindle to effect rotation of the cradle. As shown in FIG. 3, the ratchet housing 33 has a radially projecting arm 34 the distal end of which forms a pivotal connection through a pin 36 with one end of a link 35 the other end of which is pivotally connected to the end of a piston rod 37 of a pneumatic piston/cylinder unit 38. The casing of the piston/cylinder unit is carried on a fixed mounting plate 39 attached to the support assembly 16, the piston rod extending at right angles to the spindle axis 25 so that through the interaction of the pivoted link 35, extension or retraction movements of the piston rod 37 produce angular movement of the ratchet housing 33 about the axis 25.

Between the housing 33 and the spindle 24 is a ratchet mechanism 41 (illustrated only schematically) which is effective to couple the housing 33 to the spindle for joint rotation when the piston rod 37 is extended, and to interrupt such coupling when the piston rod is retracted so that the ratchet housing 33 is rotated relative to the spindle 24.

Figure 4:
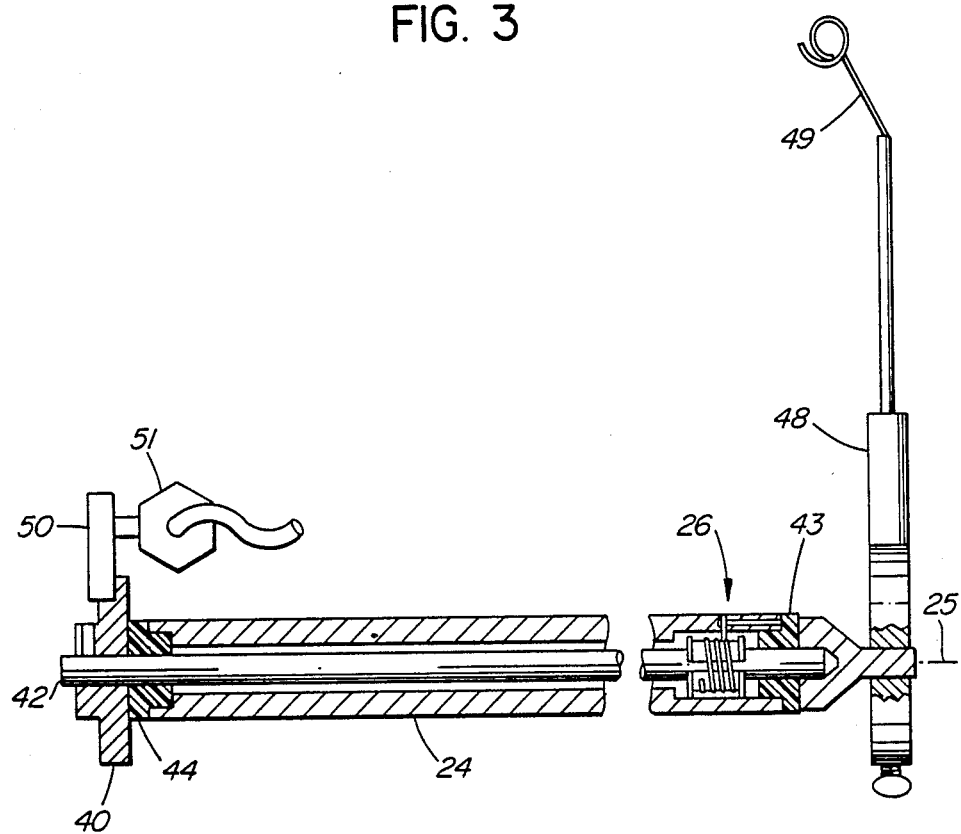
FIG. 4 is a longitudinal sectional view of the spindle of the de-reeler.

The spindle 24 is of tubular form and as seen in FIG. 4 wire guide rod 42 extends axially through the hollow interior of the spindle 24. Flanged bushings 43, 44 are positioned in opposite ends of the spindle 24 and provide bearings for rotation of the wire guide rod 42 relative to the spindle. The guide rod 42 projects beyond the distal end of the spindle and forms a driving connection to an end piece 45 by means of a grub screw 46. The end piece 45 carries a radially arranged bail arm 48 which is angled slightly downwardly at its outer end to define a wire guide loop 49.

The wire guide rod 42 is thus arranged coaxially within the spindle 24, being supported therein at its upper end by a bearing 43 and at its lower end by the bearing 44. These bearings may suitably be nylon bushings.

The wire guide rod 42 projects beyond the rear flanged bushing 44 and carries a valve disk 40 fixed to rotate with the guide rod. A rectangular notch 40a that opens from the periphery of the valve disk 40 is designed to cooperate with a pivotal actuator element of pneumatic start valve 51.

As is best seen in FIGS. 6a, 6b and 6c, clutch means 26 is provided to generate a controlled adjustable constant frictional resistance to relative rotation between the wire guide rod 42 and the spindle 24 to permit substantially unimpeded relative rotation when there is tension in the wire W. In the absence of tension in the wire W the clutch means 26 acts to cause the wire guide rod 42 to rotate with the spindle 24. The clutch 26 comprises two semi-cylindrical flanged half shells 27 positioned about the wire guide rod 42 in confronting relationship and surrounded by several turns of a coiled spring 28 having at one end a projecting arm 29 which is fixed to the spindle 24, as by a grub screw 30. In its free state the spring 28 has a diameter that is less than the diameter of the half shells 27, and accordingly when installed as shown in FIG. 6a, the spring acts to exert a light pressing force of the half shells 27 upon the wire guide 42.

When the wire guide rod rotates relative to the spindle 24 in the direction indicated by the arrow 30a in FIG. 6b, the frictional engagement between the half shells 27 and the rod 42 causes the half shells to be rotated along with the rod. This action causes the coils of the spring 28 near to the fixed arm to expand outwards, thus decreasing the spring force pressing the half shells into engagement with the rod which in turn decreases the frictional engagement. This effect is continued until the frictional engagement is sufficiently reduced to permit the half shells to slip around the rod. Conversely, if the rod 42 is rotated in the opposite direction, i.e. as indicated by the arrow 30b in FIG. 6c, then the effect upon the spring 28 is to cause it to tighten around the half shells 27 causing the rod 42 to rotate with the spindle 24.

As shown in FIGS. 1 and 2, the cradle 1 is adapted to support a coil 31 of welding wire or the like, the coil in this case being wound on a reel 32 received between the arms 23 and essentially coaxial with respect to the spindle 24. The wire W is threaded through the wire guide loop 49 to be drawn off in a generally axial direction with respect to the spool.

Rotation of the cradle 21 and spool 32 is powered by the pneumatic piston/cylinder assembly 38. When the latter is in a non-engerised condition, a brake 20 is actuated to terminate or prevent rotation of the cradle 21. The brake 20 is pneumatically operated and has a piston 20a which presses a brake pad 20b of a suitable frictional material against the underside of the cradle hub 22.

Figure 7:
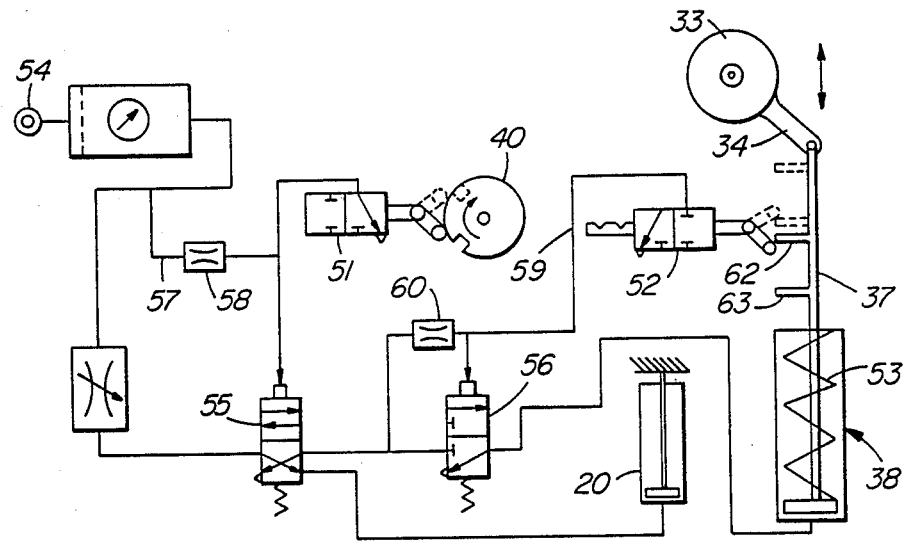
FIG. 7 is a schematic diagram illustrating the control system for the de-reeler.

As illustrated schematically in FIG. 7, the piston/cylinder unit 38 is of the single-acting type and performs a power stroke in which pressurized air moves the piston to extend the piston rod 37, the return stroke being effected by a spring 53. Pressurized air from a supply line 54 is passed to the cylinder 38 through a two-position four-way fluid control valve 55 and a two position three way fluid control valve 56 arranged in succession. The valve 55 is spring loaded to one position in which there is communication between the supply line 54 and the brake cylinder 20. The valve 56 is spring loaded to a position wherein the cylinder 38 is vented to atmosphere. The supply line 54 is also connected to a first pilot circuit 57 through a choke 58 which restricts air supply to the pilot circuit to a very low flow rate. The pilot circuit 57 when pressurized acts upon the control valve 55 to switch it to its second position wherein it supplies pressurized air to the valve 56 and to a second pilot circuit 59 having a choke 60. The first pilot circuit 57 is designed to be selectively vented or sealed by the start valve 51 whereas the second pilot circuit 59 is designed to be vented or sealed by the cycle valve 52. When either of these pilot circuits is vented, the associated flow control valve 55 or 56 prevents the supply of pressurized air from driving the cylinder 38 since the pilot circuit pressure cannot rise to a level sufficient to effect switching of the associated flow control valve.

The start valve 51 is connected to a pivoted actuator element 50 one end of which extends into the notch 40a in the valve actuator disc 40 that is fixed to rotate with the rod 42. Rotation of the rod 42 in one direction, that is corresponding to clockwise rotation of the bail arm 48 as seen in FIG. 1, causes the disc 40 to interact with the element 50 to close the valve 51 and prevent escape of air therethrough. Conversely, rotation of the rod 42 and disc 40 in the opposite direction causes the valve 51 to open and depressurize the first pilot circuit 57.

The cycle valve 52 as illustrated in FIG. 3 is fixedly mounted on the support assembly 16 and is adapted to be operated by adjustable cams 62 and 63 associated with the arm 34 of the ratchet housing 33. The cycle valve 52 acts as a proximity switch in that when the piston rod 37 completes its extension stroke, the cam 63 comes into engagement with the valve 52 to open it thus venting the second pilot circuit 59 and causing the control valve 56 to be moved to a position wherein the cylinder is exhausted allowing the piston rod to be retracted under the force of the spring 53. Upon completion of the return stroke, the cam 62 closes the valve 52 so that if the valve 51 is also closed, pressure can be built up in the pilot circuits 57, 59 to switch the control valve 56.

The operation of the de-reeler is as follows. To load a spool 32 that is positioned standing on the support surface with its axis horizontal, the frame 10 of the de-reeler is tilted so that the edges 13 rest upon the floor and the open front is substantially vertical. In this position and with the bail arm 48 removed, the frame is moved towards the reel to pass the spindle through the core thereof so that the reel is received in the cradle 21 with the bent ends of the arm 23 extending over the periphery of the reel. While applying force to the reel to hold it in the cradle 21, the frame 10 is tilted about the corners 15 until the bottom edges of the sidewalls base plate 11 contact the floor. The reel 32 is thus supported in the position as shown in FIG. 1, and its lower edge is spaced above the floor by virtue of the fact that the corners 15 are spaced away from the reel.

The outermost turn of the coil 31 is then threaded through the guide 49 so that the wire W can be drawn off the reel through the guide generally in the direction of the axis 25, and delivered to the point of use, typically an automatic welding machine. From a consideration of FIG. 1 it will be appreciated that drawing off of the wire W will tend to produce an interaction with the guide 49 to rotate the bail arm 48 in the counter-clockwise direction as seen in FIG. 1. With the components positioned as represented in FIG. 7, this counter-clockwise rotation will, after taking up any clearance, reach a limiting position in which the start valve 51 is switched to the closed position. Pressure can now build up in the pilot circuit 57 until it is sufficient to change over the valve 55 to supply pressurized air to the second pilot circuit 59. At the same time the cylinder of the brake 20 is vented to atmosphere through the valve 55. Since the cycle valve 52 is closed (the piston rod having been retracted under the influence of the spring 53) pressure can now build up in the second pilot circuit 59 until it is sufficient to switch the control valve 56 whereupon pressurized air is supplied through this valve to the cylinder 38 to extend the piston rod 37. As will be understood, extension of the piston rod acts through the arm 34 and ratchet mechanism 41 to rotate the spindle 25 in a direction such as to unwind wire from the coil 31, i.e. in the clockwise direction as seen in FIG. 1.

When the piston rod 37 has extended through its full stroke, the adjustable cam 63 opens the cycle valve 52 venting the pilot circuit 59 so that the control valve 56 switches to its second position connecting the cylinder unit 38 to exhaust and allowing the piston to be retracted under the force of the spring 53. Upon completion of the retraction stroke the adjustable cam 62 engages and closes the cycle valve 52. If at this time the start valve 51 is still closed, as would occur if the amount of wire unwound by the preceding rotation of the spindle is not sufficient to slacken the wire W being drawn off, the pilot circuit 59 will again be pressurized to initiate another cycle of operation of the piston cylinder unit 38, and such cycles will be repeated until the start valve 51 is opened to vent the pilot circuit 57 and apply the brake 20.

When the wire is drawn off through the wire guide 49 it rotates the bail arm 48 and the rod 42 in the direction indicated by the arrow 30a in FIG. 6b. Since the half shells 27 are pressed into engagement with the rod 42 by the spring 28, they are initially rotated with the rod due to the frictional engagement. This initial rotation causes the coils of the spring 28 closest to the fixed arm 29 to expand outwards, thus decreasing the force of engagement of the spring 28 upon the half shells 27 and thus reducing the frictional engagement of the latter upon the rod 42. At some point the effort required to further expand the spring 28 is sufficient to overcome the frictional engagement between the half shells 27 and the rod 42 so that slippage will occur. The force required to effect such slippage is the maximum force that it is needed to rotate the rod 42 and bail arm 48 relative to the spindle 24, and due to the configuration of the clutch means 26, this force will remain relatively constant over a wide range of speeds. If the tension in the wire being drawn off decreases, the spring 28 will attempt to regain its original form, closing the half shells 27 into increasing frictional engagement with the rod 42, causing the rod to rotate with the spindle 24 and opening the start valve 51. The tension required to draw off wire is determined by the nature of the spring 28 and the frictional characteristics of the half shells 27 and the rod 42. These properties may be selected to suit the material being fed. Because the clutch means 26 is inherently self regulating, it requires no adjustment to compensate for normal wear.

Opening of the start valve 51 will thus occur when the de-reeler has unwound wire material in excess of the demand for the wire W being drawn off. In that event the tension in the wire W will be relieved thus allowing the bail arm 48 to be carried in the direction of rotation of the reel 32 (clockwise in FIG. 1) thus rotating the rod 42 so that the disc 40 causes the start valve 51 to open. In the absence of tension in the drawn off wire W, the bail arm and rod 42 will be carried in the direction of movement of the reel by the frictional drag created through engagement of the clutch means 26 on the rod 42.

Deceleration of the coil is effected by the frictional engagement of the pad 20b on the hub 22 when the brake 20 is actuated.

In a typical application in feeding welding wire to an automatic welding machine the maximum feed rate of the welding wire would be about 1000 inches per minute which would correspond to a maximum speed of rotation of the spindle 24 of 100 rpm, the coil weight being in the range of 250 to 300 pounds. For this situation the piston 38 disclosed would have a bore of 1.5 inches and a stroke of 3 inches, operating at a pressure of 60-70 psi. The dimensions of the elements and the operating pressure of the cylinder can of course be changed to adapt to various conditions.

Figure 8:
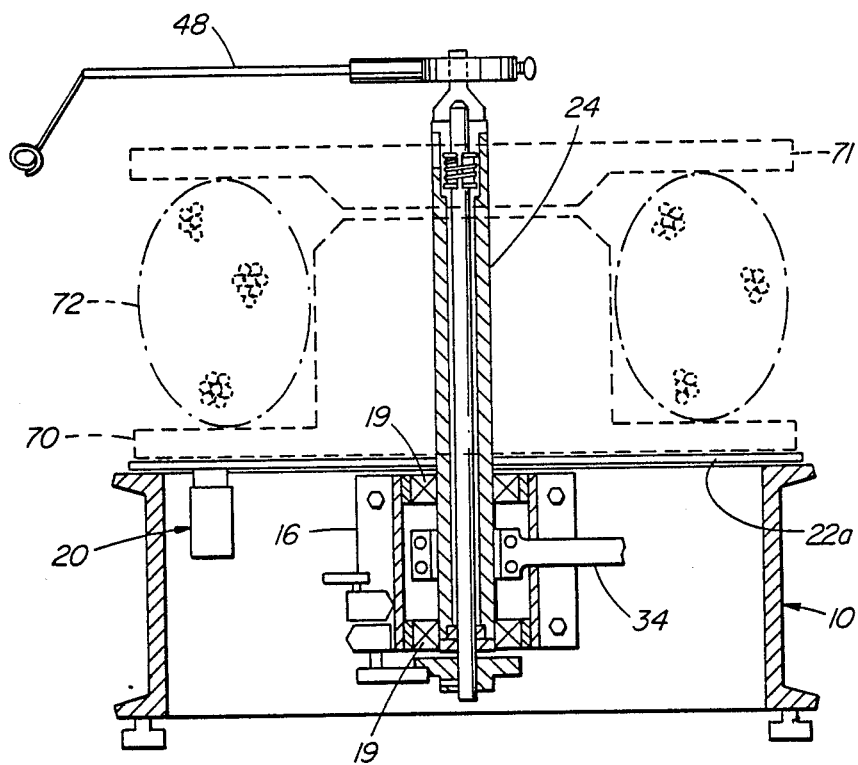
FIGS. 8 and 9 show two alternative embodiments of de-reeler.
Figure 9:
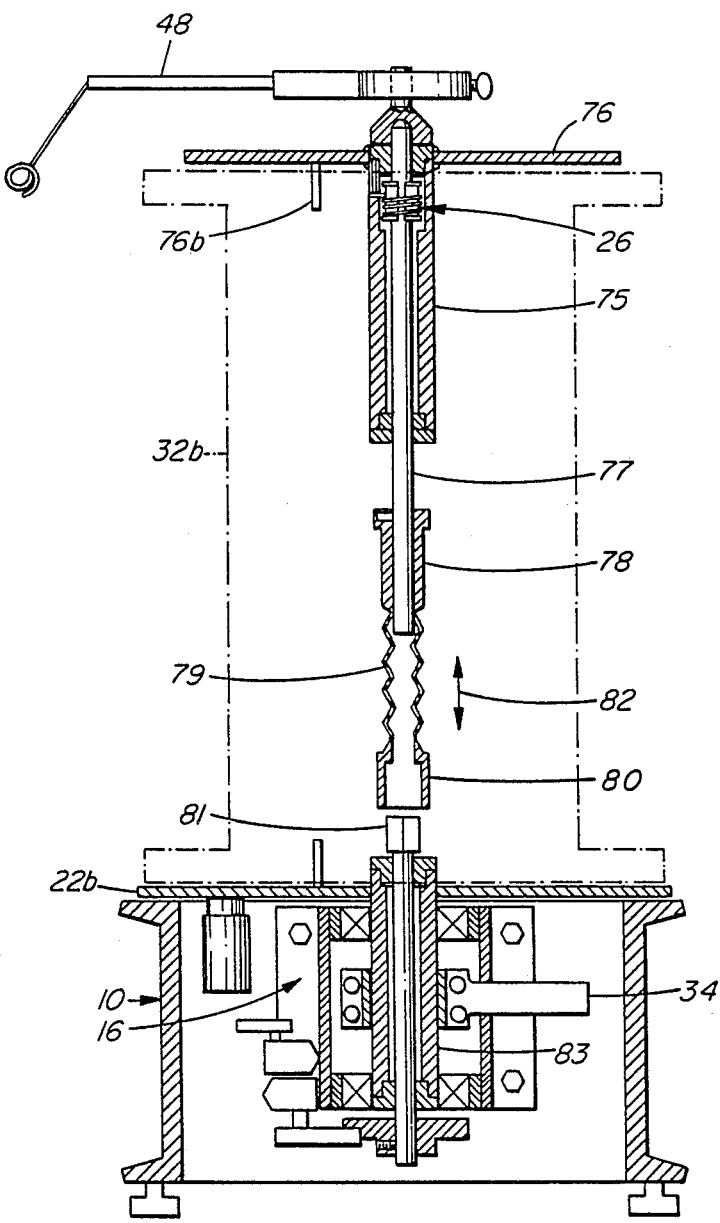

The de-reeler can be provided in many different configurations, two alternative arrangements being illustrated in FIGS. 8 and 9 by way of example. In both of these embodiments the de-reeler is arranged with the spindle axis vertical. The de-reeler shown in FIG. 8 is of a heavy duty variety designed to accept standard spools weighing up to 1,000 pounds. As shown, this de-reeler is also equipped to accept bulk coils of wire. As opposed to reels or spools, bulk coils are not wound onto spools or other supports, but rather are held in shape by bands of strapping wrapped around the coil. Thus the de-reeler of FIG. 8 is provided with a spool having a bottom flanged 70 connected to the disc shaped hub 22a and a separatable upper flange 71. To load the coil 72, the upper flange is removed, and the coil placed on the lower flange. The upper flange is then attached and the bands of strapping are severed to allow unwinding of the coil 72.

The de-reeler unit shown in FIG. 9 is designed to accept relatively a tall spool 32b as shown. To this end, the de-reeler is provided with a two part spindle, the upper spindle part 75 having a top end that passes through a flat triangular plate 76 above which the bail arm 48 is arranged to rotate. A pin 76a in the plate forms a driving connection with a recess (not shown) in the spool 32b. Immediately adjacent the triangular plate is an enlarged portion of the spindle in which the clutch means 26 is positioned. The wire guide rod 77 extends from the lower end of the upper spindle part 75 and is received in an elongated socket in an adjustable sleeve 78, the sleeve having a set screw (not shown) therein to engage the rod 77 at various positions along its length to accommodate the normal variations in the axial length of individual spools that may be encountered in use. The sleeve 78 has a flexible central section 79 and a lower end 80 defining a hollow coupling adapted to receive the end of the lower part 81 of the wire guide rod 77. The sleeve 78 is adjustable as indicated by the double arrow 82.

The lower spindle part 83 and the associated lower wire guide rod part protrude 81 through the spool carrier cradle which is in the form of a flat circular plate 22b welded to the spindle. The protruding portion of the spindle part 83 serves to center the spool on the cradle.

The de-reeler described above and illustrated in the accompanying drawings offers significant advantages over de-reelers of the prior art. In particular it is of simplified low-cost construction and is portable, yet strong, being adapted for easy loading and unloading of coils of welding wire and the like. The de-reeler can operate over a large range of speeds without need for adjustment, the maximum speed being determined by the maximum possible rate of cycling of the piston cylinder unit 38. Furthermore wire can still be drawn off through the guide 49 even in the event of malfunction of the de-reeler through failure of the piston/cylinder unit to operate to unwind wire from the coil, In that event the reel 32 will remain stationary, and as the wire W is drawn off the bail arm 48 will rotate the guide 49 continuously about the axis 25 thus avoiding breakage of the wire W. The wire can thus continue to be drawn off at the rate required, but in this mode of operation will not be delivered in untwisted condition, but rather will include one twist for each turn of wire drawn off.

In evaluating prior art uncoiler designs, the present inventor has concluded that their primary limitation has been the short has concluded that their primary limitation has been the short amount of time available in which the coil has to be accelerated to the required speed. It become apparent to him that the reason for this was the arrangement of the guiding devices employed in the prior art, which typically included a pivotally or otherwise mounted guide biased by a spring which would be overcome by an increase in the tension of the material being drawn off allowing the guide to move so that it affects a controlling means. In these prior art designs the critical limitation has been the amount of material which can be fed out before the guide reaches the limit of its travel. The guide could only travel a comparatively short distance before this limit was reached, therefore it was necessary to ensure that, before this limit of travel was reached, the actuator means driving the coil was energized to accelerate the coil to the required speed within the limited time available.

This limitation is completely avoided by the improved de-reeler as described in the foregoing and shown in the drawings; there is no limitation in the extent to which the guide 49 can rotate about the axis 25, so that rapid angular acceleration of the coil and correspondingly highly powered actuator means are not required. In other words, since the time available to accelerate the coil to the required speed is no longer dependent upon the geometry of the guide arm, and is increased substantially over the time available with prior art designs, it becomes possible to use a smaller and less expensive actuator.

The de-reeler of the prevent invention also improves over prior are designs in terms of stopping rotation of the coil once the demand for the material has ceased. Whereas in prior art designs various heaving duty braking arrangements were provided, in the present design the deceleration is accomplished by means of the relatively small and simple brake 20. The time available for deceleration of the coil is dependent upon the distance between the de-reeler and the machine being fed. During such deceleration the guide 49 will be carried along with the reel 32 applying a twist to the material which will be removed when the material is drawn off once more.

I claim:

1. A de-reeler adapted to support a coil of strand-like material and to unwind such material from the coil automatically on demand, said de-reeler comprising:
a frame;
a cradle mounted to rotate about an axis in said frame and adapted to receive the coil generally co-axially thereon;
powered actuator means supported on said frame and operative to effect angular movement of said cradle and coil in one direction of rotation to unwind material from the coil;
guide means pivotally mounted to move angularly about the axis of the coil to guide drawn-off material generally axially away from the coil in, said guide means being adapted to react to tension applied to the drawn-off material to move angularly in the other direction of rotation;

sensor means adapted to respond to movement of the guide means in said other direction to energise said power-actuated means and rotate said coil in said one direction thereby to unwind additional material from the coil, such that when the rate at which additional material is unwound from said coil exceeds the rate at which the material is drawn off through the guide means, the guide means is freed to move in said one direction and actuate said sensor means to de-energize said power actuated means;

said guide means having an unlimited range of pivotal movement about said cradle axis, whereby the amount of material drawn-off from said coil can exceed by more than one turn the amount of material unwound from the coil by rotation of the cradle.

2. A de-reeler according to claim 1 wherein said powered actuator means is a fluid powered motor.

3. A de-reeler according to claim 2 wherein said fluid powered motor is a linear actuator.

4. A de-reeler according to claim 3 wherein said linear actuator is a pneumatic piston/cylinder unit.

5. A de-reeler according to claim 4 wherein said piston cylinder unit is coupled to drive said cradle and coil through a ratchet drive mechanism.

6. A de-reeler according to claim 5 wherein said piston/ cylinder unit is single-acting.

7. A de-reeler according to claim 1 further including a brake operative when engaged to generate a force to inhibit rotation of said cradle, said brake being coupled for control by said sensor means to be released when said power actuated means is energized, and vice-versa.

8. A de-reeler according to claim 1 wherein said actuator means is a fluid powered piston/cylinder unit coupled to drive said cradle through a ratchet mechanism, supply of pressurized fluid to said piston/cylinder unit being controlled by a fluid valve means that has a first setting in which it delivers pressurized fluid to said piston/cylinder unit to perform a power stroke, and has a second setting in which it exhausts fluid from said unit to permit a return stroke, proximity switch means being located for activation upon completion of said power stroke and upon completion of the return stroke to change the setting of said fluid valve means, said sensor means being effective when actuated by said guide means to place said fluid valve means in its first setting.

9. A de-reeler according to claim 8 wherein said fluid valve means is spring loaded towards its second setting, and is adapted to be urged to its first setting by fluid pressure built-up in a pilot circuit when said proximity switch means is de-activated and said sensor means is actuated, activation of said proximity switch means or de-activation of said sensor each being effective to vent said pilot circuit and prevent build-up of fluid pressure therein.

10. A de-reeler according to claim 1 wherein said sensor means is located in a first pilot circuit that is connected to control a first fluid valve through which pressurized fluid can be supplied alternatively to a fluid brake that is operable to inhibit rotation of said cradle, and to a second fluid valve through which the pressurized fluid can be supplied to said powered actuating means, said powered actuating means comprising a linear fluid pressure motor coupled to drive said cradle through a ratchet mechanism; and further comprising control means that is operable to cycle said linear fluid pressure motor through successive extension and retraction strokes so long as pressurized fluid is supplied to said second fluid valve through said first fluid valve.

11. A de-reeler according to claim 10 wherein said control means comprises a second pilot circuit that is connected to control said second fluid valve, proximity switches being positioned to be operated upon completion of a power stroke and a return stroke respectively of the fluid pressure motor to alternately vent or close said second pilot circuit and thus switch the condition of said second fluid valve.

12. A de-reeler according to claim 1 wherein said guide means is supported on a radial arm carried on a shaft extending through the axial region of said coil, said guide means being continuously rotatable about the axis of said shaft such that even when said coil is stationary material can be drawn off in a generally axial direction through said guide means, the latter rotating through one complete revolution for each turn of material drawn-off from the coil.

13. A de-reeler according to claim 1 wherein the frame is pivotable on a support surface from a loading position, wherein the axis of rotation is substantially horizontal, to an operating position wherein this axis is upwardly inclined at a large angle relative to the horizontal, such that in the loading position the frame can be engaged to a reel standing on said support surface with its axis horizontal and thereafter the frame and reel can be tilted together to the operating position.

14. A de-reeler according to claim 13 wherein such tilting movement is effected about a line of contact between the frame and the supporting surface that is spaced from an adjacent end face of the reel such in the operating position the reel is supported clear of the supporting surface.

15. A de-reeler according to claim 1 wherein said cradle is carried on a hollow spindle that is rotatably mounted in bearings in said frame, said spindle extending outwardly to pass through the core of a coil received in the cradle, said powered actuating means being coupled to drive said spindle in rotation; a guide rod extending axially through said spindle and being rotatable said sensor means being positioned in said frame adjacent one end of said guide; said guide means being provided on a radial arm that is attachable to the other end of said guide rod above the coil such that said guide means is positioned to rotate about the periphery of the coil.

16. A de-reeler according to claim 15 wherein said guide rod is adjustable in length to accommodate coils of different of axial lengths.

17. A de-reeler according to claim 15 wherein said powered actuator means is a pneumatic piston/cylinder unit coupled to drive said spindle through a ratchet drive mechanism.

18. A de-reeler according to claim 15 further including a brake operative when engaged to generate a force to inhibit rotation of said cradle, said brake being coupled for control by said sensor means to be released when said power actuated means is energized and vice versa.

19. A de-reeler according to claim 18 wherein said sensor means is located in a first pilot circuit that is connected to control a first fluid valve through which pressurized fluid can be supplied alternatively to said brake or to a second fluid valve through which the pressurized fluid can be supplied to said powered actuating means, said powered actuating means comprising a linear fluid pressure motor coupled to drive said spindle through a ratchet mechanism; and further comprising control means that is operable to cycle said linear fluid pressure motor through successive extension and retraction strokes so long as pressurized fluid is supplied to said second fluid valve through said first fluid valve.

20. A de-reeler according to claim 19 wherein said control means comprises a second pilot circuit that is connected to control said second fluid valve, proximately switches being positioned to be operated upon completion of a power stroke and a return stroke respectively of said fluid pressure motor to alternately vent or close said second pilot circuit and thus switch the condition of said second fluid valve.

21. A de-reeler according to claim 15 including clutch means operative to permit rotation of said guide rod with respect to said spindle in said other direction of rotation to permit unwinding of the material from the coil.

22. A de-reeler according to claim 21 wherein said clutch means is operative to prevent rotation of said guide rod relative to said spindle in said one direction of rotation.

23. A de-reeler according to claim 22 wherein said clutch means comprises two half shells that loosely surround a cylindrical portion of said guide rod, and a coiled torsion spring surrounding said half shells and being anchored at one end to one of the them, the torsion spring acting to urge said half shells into driving frictional engagement with said cylindrical portion, said tortion spring having an opposite end that is engageable with said spindle, such that upon relative rotation of said guide rod with respect to said spindle and said other direction of rotation, said tortion spring is loosened to allow said half shells to slip angularly rather to said guide rod.

* * * * *